(12) United States Patent
Kriegman

(10) Patent No.: US 6,870,574 B2
(45) Date of Patent: Mar. 22, 2005

(54) METHOD AND APPARATUS FOR ENHANCED PUPPETRY OR SIMILAR TYPES OF PERFORMANCES UTILIZING A VIRTUAL SET

(76) Inventor: Mitchell Kriegman, 59 Horatio St., New York, NY (US) 10014

( * ) Notice: Subject to any disclaimer, the term of this patent is extended or adjusted under 35 U.S.C. 154(b) by 35 days.

(21) Appl. No.: 10/215,622

(22) Filed: Aug. 9, 2002

(65) Prior Publication Data

US 2002/0191110 A1 Dec. 19, 2002

Related U.S. Application Data

(63) Continuation of application No. 09/537,529, filed on Mar. 29, 2000.
(60) Provisional application No. 60/187,814, filed on Mar. 8, 2000.

(51) Int. Cl.$^7$ ................................................. H04N 9/75
(52) U.S. Cl. ...................... 348/587; 348/722
(58) Field of Search .............................. 348/584–587, 348/722; H04N 9/75

(56) References Cited

U.S. PATENT DOCUMENTS

| | | | |
|---|---|---|---|
| 1,874,819 A | * | 8/1932 | Simmons ..................... 446/84 |
| 3,899,848 A | | 8/1975 | Bunin |
| 3,916,562 A | | 11/1975 | Burkhart |
| 4,094,092 A | | 6/1978 | Bunin |
| 4,689,683 A | | 8/1987 | Efron |
| 5,151,793 A | | 9/1992 | Ito et al. |
| 5,343,252 A | | 8/1994 | Dadourian |
| 5,479,597 A | | 12/1995 | Fellous |
| 5,519,826 A | | 5/1996 | Harper et al. |
| 5,737,031 A | | 4/1998 | Tzidon et al. |
| 5,764,306 A | | 6/1998 | Steffano |
| 5,790,124 A | | 8/1998 | Fischer |
| 5,886,747 A | | 3/1999 | Tzidon et al. |
| 5,923,400 A | | 7/1999 | Spector |
| 5,949,433 A | | 9/1999 | Klotz |
| 5,960,074 A | | 9/1999 | Clark |
| 5,971,544 A | | 10/1999 | Perry |
| 5,980,357 A | | 11/1999 | Newby |
| 6,014,163 A | | 1/2000 | Housekeeper |
| 6,034,739 A | | 3/2000 | Rohling et al. |
| 6,034,740 A | | 3/2000 | Mitsui et al. |
| 6,101,289 A | | 8/2000 | Kellner |
| 6,122,013 A | | 9/2000 | Tamier et al. |
| 6,396,495 B1 | * | 5/2002 | Parghi et al. ................ 345/426 |

OTHER PUBLICATIONS

The Character Shop, Nov. 27, 1996, http://web.archive.org/web/19961127054822/http://www.character-shop.com/puppetfx.html, pp. 1–4.
http://www.eng.iastate.edu/explorer/topics/specialeffects/bulescreen.htm, Jan. 1, 1996, pp. 1–2.
Entertainment Design Workshop, LLC., 1999, Descriptive Memorandum, pp. 1–43.

* cited by examiner

*Primary Examiner*—David E Harvey
(74) *Attorney, Agent, or Firm*—Dickstein, Shapiro, Morin & Oshinsky, L.L.P.

(57) ABSTRACT

An improved method for enhanced puppetry or similar types of performances utilizing a virtual set having a key-color screen behind the set to do live action filming. All objects on the set, except for the performing puppet, or other objects which are to appear in the final product, are wrapped in a material which matches the color of the keycolor screen. A virtual background is generated and combined with the live action whereby only the puppet (or other object) appears on the virtual background in real time, with all other objects on the live set, including puppeteers, for example, being eliminated from the final product.

2 Claims, 3 Drawing Sheets

METHOD AND APPARATUS FOR ENHANCED PUPPETRY OR SIMILAR TYPES OF PERFORMANCES UTILIZING A VIRTUAL SET

CROSS-REFERENCE TO RELATED APPLICATIONS

This application is a continuation of nonprovisional patent application Ser. No. 09/537,529, filed Mar. 29, 2000 which, in turn, is based on provisional application, Ser. No. 60/187,814, filed on Mar. 8, 2000, entitled "GI Enhanced Puppetry".

FIELD OF THE INVENTION

This invention is directed to an innovation in puppetry performances using virtual sets, as well as similar types of performances where it is desirable to selectively combine real images with virtual images in real time.

BACKGROUND OF THE INVENTION

Puppet shows have existed since antiquity in almost all countries of the world. In most forms, the puppet is manipulated either directly by hand, or by rods, strings or wires. Shadows of puppets are also sometimes used in a performance.

Perhaps the most advanced form of puppetry is Bunraku Puppetry. This form was originally developed at the end of the sixteenth century in Japan, and later took its name from Uemura Bunrakuken, a famous Japanese promoter in the early nineteenth century.

Bunraku puppetry requires teams of three to four puppeteers to stand behind each puppet and move the arms, legs, mouth and body using rods and the puppeteer's hands. The chief manipulator supports the puppet by inserting his or her left hand into the puppet body from behind, to move the puppet's head and mouth. His or her right hand controls the puppet's right hand. The assistants respectively take charge of the puppet's feet and left hand.

Since three or four people handle the different parts of the puppet, lifelike motion cannot be achieved without precision timing among the manipulators. For all motions, there are detailed rules and forms to be followed. No manipulator is allowed to act on their own.

In Japan, when operating this type of puppet on stage, the manipulators, as a rule, wear black gowns and black hoods. This signifies that the puppet is the main performer with the manipulator remaining behind the scenes. In the Japanese theatrical tradition, black costumes represent the invisible or nothingness.

It is one object of this invention to apply this form of advanced puppetry to the movie and video industry and make the manipulators truly invisible to the viewer in real time, while achieving lifelike movement of the puppets on the screen. This object is achieved through use of a significant improvement to what is known in the film industry as the "blue screen or key-color process."

It is well known in the motion picture and video industry that two or more images can be combined into a single scene. This technique of combining images is primarily achieved through use of a key-color process in which one image is photographed against a solid key-color background, (such as blue, green or grey) and the second image is substituted in place of that key-color background. It is also known that the background can be various other colors, and that the substitution can be made electronically, or through optical photographic techniques. This process is also known as a keying process.

In such a known system, the image of an announcer, for example, is shot with a live camera in front of a blue screen as a foreground image. Subsequently, a background image is generated in real time as a result of graphics processing performed by a high speed computer, and is super-imposed on the foreground image. The super-imposed portion of the background image and the foreground image is blanked out by the keying process and a composite image is obtained by fitting an object's image portion of the foreground image into the blank portion.

Although there are many advantages to using the standard key-color process, there are also several disadvantages. For example, the key-color process is generally an iterative process in which the end product, or combined file or video is composited or "married in post" and is not viewable for evaluation until the entire process has been completed. As a result, film producers frequently view the end product and require changes to either the foreground or background portions, requiring that the entire sequence be "reshot." Furthermore, because the process is post rendered in real-time, it is difficult to perform actual interaction between a moving puppet, for example, and the puppet's environment. The normal cycle for "blue screen" film production can require several iterations of this process. Various U.S. patents describe this process and variations thereof in greater detail, including U.S. Pat. Nos. 4,689,683, 5,479,597, 5,764, 306, 5,949,433 and 6,034,740.

It is, therefore, a further object of this invention to provide a significant improvement to the known key-color process directed to the use of puppetry in the film and video industries utilizing virtual sets.

It is a still further object of this invention to provide an improved keying process which allows the use of an advanced form of puppetry with three or more puppeteers where the producer, the puppeteers, and the director can view the final product in real time as the live puppet show progresses.

It is another object of this invention to apply the inventive method and apparatus to film and video productions which do not necessarily include puppets and puppeteers.

SUMMARY OF THE INVENTION

In accordance with the invention, a puppet or other object to be filmed is placed on a set in front of a key-color background screen. Additional objects may also be present on the set, such as puppeteers to manipulate the puppet or additional supporting objects.

Prior to commencement of live action filming, all objects on the set, except the puppet or other objects to be seen in the final film product, are covered with material matching the color of the key-color background screen.

A computer generated virtual background is then produced which is combined with the live action filming.

It is a feature of the invention that when the live action is combined with the virtual background, all objects covered with the key-color material disappear from the final viewed product.

It is a further feature of the invention that the puppeteers or other viewers can see the final production in real time with all supporting objects absent from the scene.

The foregoing and other objects and features of this invention will be more fully understood from the following description of an illustrated embodiment thereof, in conjunction with the accompanying drawings.

DETAILED DESCRIPTION OF THE PREFERRED EMBODIMENTS

Figure 1:
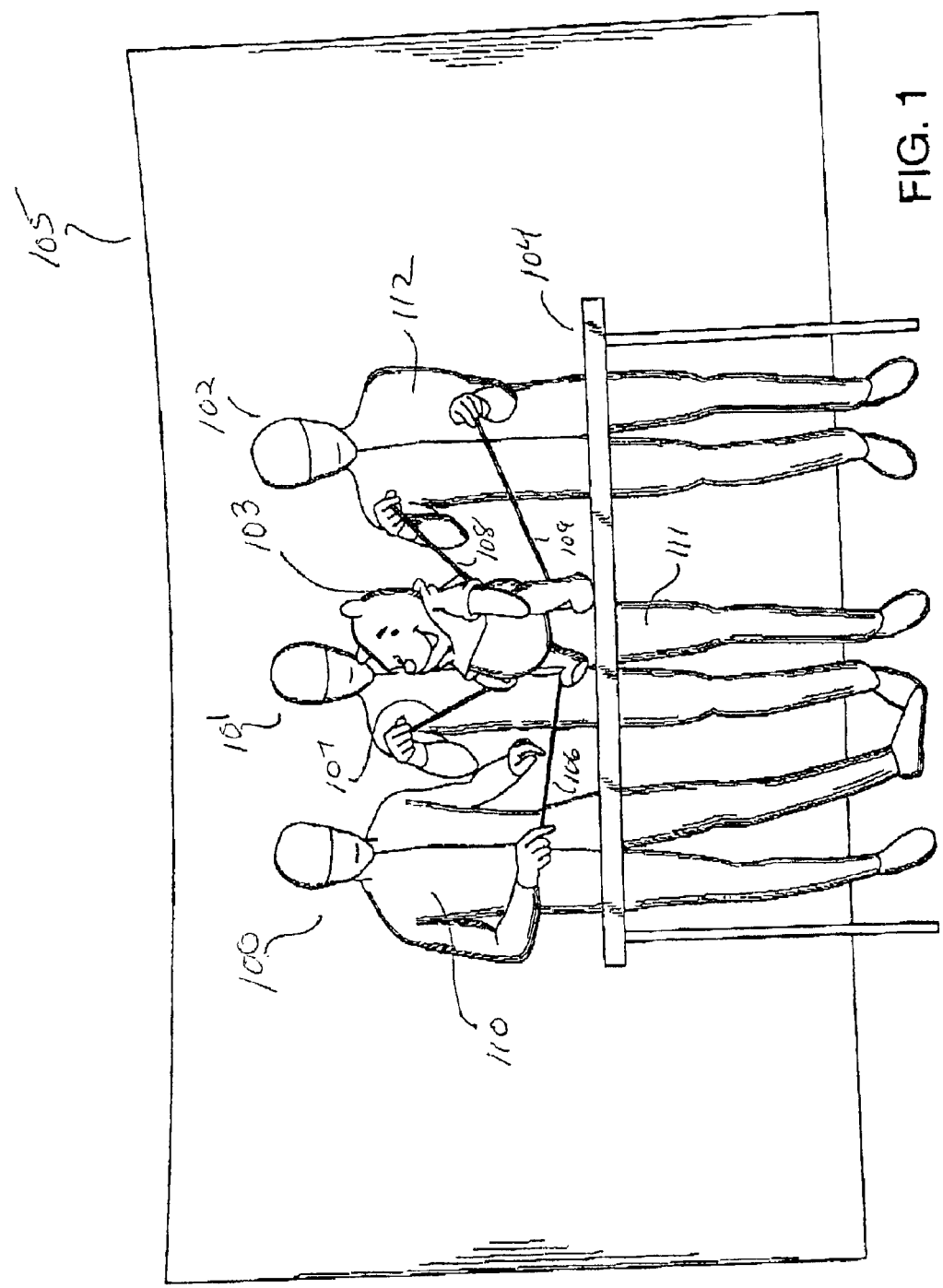
FIG. 1 illustrates a front view of the virtual set of the instant invention.

Referring now to FIG. 1, there is shown a virtual set in accordance with one embodiment of the invention directed to puppetry.

Puppet 103 is the type of advanced puppet described above, which takes a minimum of 3 puppeteers/manipulators, 100, 101 and 102 to operate the puppet in a life-like manner.

The puppet rests on table 104, and the background consists entirely of key-color background screen 105. Rods 106–109, etc., are used by the puppeteers to control all movements of puppet 103.

Advantageously, as shown in FIG. 1, the puppeteers wear head-to-foot highly reflective keyable color spandex suits, 110, 111 and 112. As shown, the suits include a hood, gloves, foot coverings and a piece of gauze, or similar material, over the eyes. The key-color of the material completely covering the puppeteers exactly matches the color of key-color screen 105. Similarly, table 104, rods 106–109, the studio floor, and all other objects in the set, except puppet 103, will exactly match the color of key-color screen 105.

In contrast, puppet 103 is designed and built with special care not to include colors in the body of the puppet that would match the key-color. Special care is taken to insure that puppet 103 does not include the key-color in its coloring or shading.

Key-color screen 105 is typically in the shape of a hard cyclorama, which is built and painted a reflective keyable color. This color could be reflective green or blue, or even a highly reflective gray. A cyclorama is essentially a high wall that is curved at the base to eliminate any hard lines in the set that can cause shadows. Ideally, when filming the action of puppet 103, the "shoot" is into the curved corner of two cyclorama walls.

Table 104 is designed to be approximately thirty-six (36) inches high, but, of course, can be in various shapes and forms and multiple tables can be used. All tables to be used on the set can be adjusted for height and size, and would be painted the same keyable color as screen 105.

These tables are used by the puppeteers to simulate where the ground would be in the virtual set. This gives the puppets, when they walk within the virtual set, something real to step on so the action of walking is believable. These tables can also have a light source within the table to create a glow from below in order to further eliminate shadows where the characters touch the table surface.

The lighting strategies are very important to the success of the inventive technique. Successfully marrying two images in real time—the live puppets and a virtual background—without shadows or key-color problems, is the measure of success for the technical process. Suffused lighting that creates an overall lack of shadows is the base of the lighting techniques. The use of the glowing tables is a second key to eliminating shadows. The use of ultraviolet light is another technique that successfully places light in all shadow areas that the camera does not read because it does not register that kind of light. Such lighting strategies are known, have been used with prior art key-color schemes, and will not be described herein in further detail.

Since all objects shown on the set in FIG. 1, except for puppet 103, are the exact same key-color as screen 105, it is to be understood that all such objects can be eliminated from a shot taken of the set shown in FIG. 1 utilizing known key-color techniques. Advantageously, in this way, puppet 103 will appear autonomous, free and independent of control in the final filmed scene. This, also completely eliminates the need for a puppet set, which is an enclosure to hide the puppeteers.

Figure 2:
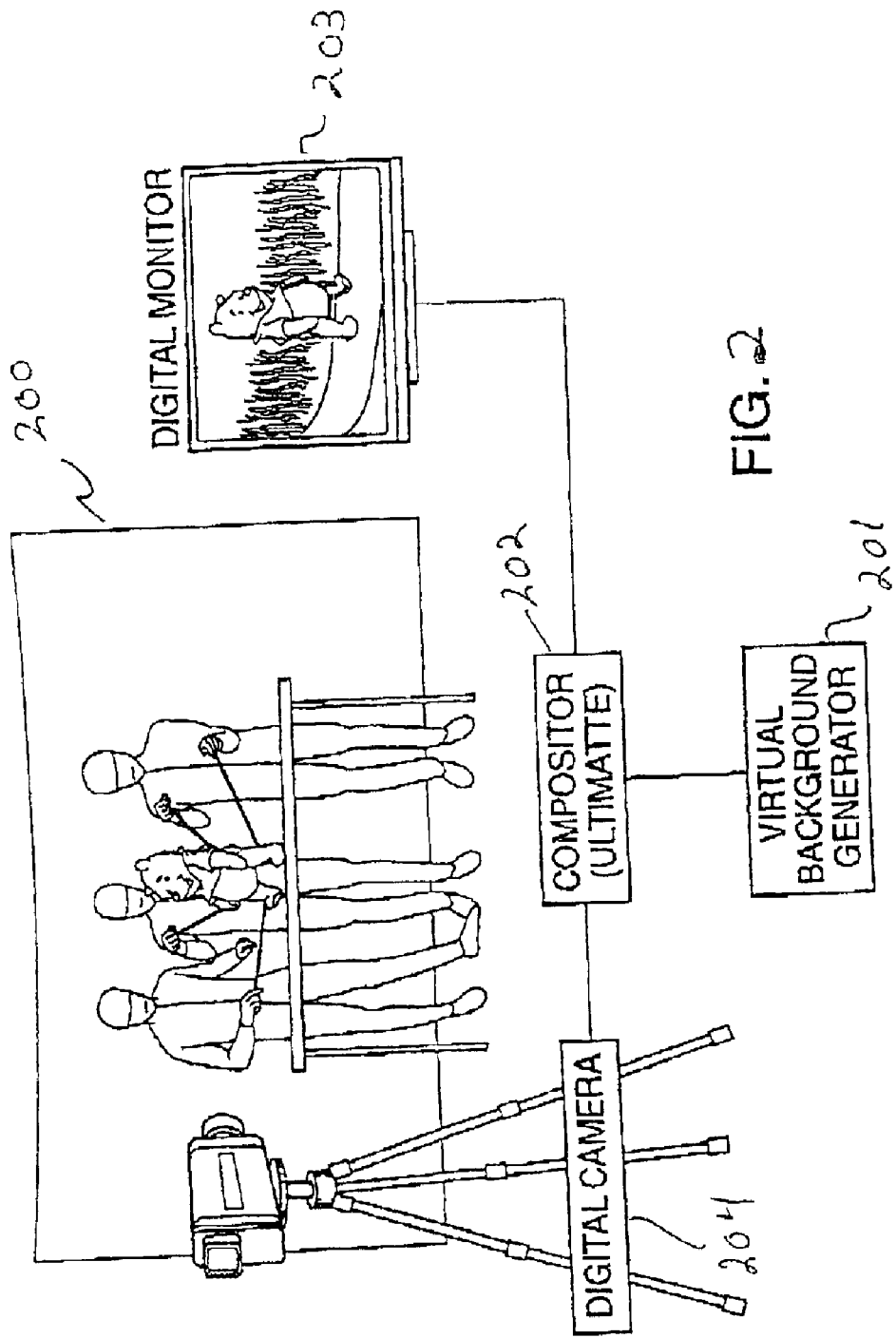
FIG. 2 illustrates a block diagram of the various components utilized to create film and/or video in accordance with the instant invention.

Referring now to FIG. 2, there is illustrated the manner in which a shot is actually taken of the set shown in FIG. 1. Set 200 is the same set as shown in FIG. 1. A shot of the performance on the set is taken with digital camera 204, and the digital output of camera 204 is sent to video compositor 202. It is, of course, understood that a standard film or video camera could be used in place of a digital camera, with the performance being digitized in a well-known manner. This video compositor can be, for example, an Ultimate device. The Ultimate technique has been used in video compositing for 20 years, is well known in the art, and will not be described in further detail herein.

The virtual background to be combined with the actual performance taken by digital camera 204 is generated by virtual background generator 201.

Virtual backgrounds can be designed within a computer in any variety of virtual software programs. L-set and Maya are two examples, but this software is always changing and being innovated. What is key, is that the virtual system is a real time system that streams the set in real time so that the studio video switching system can composite both the live puppet image with the computerized virtual sets simultaneously. Typically, an Onyx (a high capacity, very fast computer) is used for this purpose, but there are several real time virtual composite systems on the market, all with different degrees of ease of use. The studio itself, to be used with the invention, as far as control room equipment is concerned, can be conventional, requiring tape machines, switchers and all the usual elements although maximized for good key-color technique.

After the outputs of digital camera 204, and virtual background generator 201 are combined in video compositor 202, the combined output is sent to digital monitor 203. Advantageously, what is shown on digital monitor 203 is only the movements of puppet 103 superimposed on the virtual background generated by virtual background generator 201. The puppeteers, which were controlling the puppet on the actual set, shown in FIG. 1, are completely eliminated from the final product, and only the puppet and the virtual background are visible.

Figure 3:
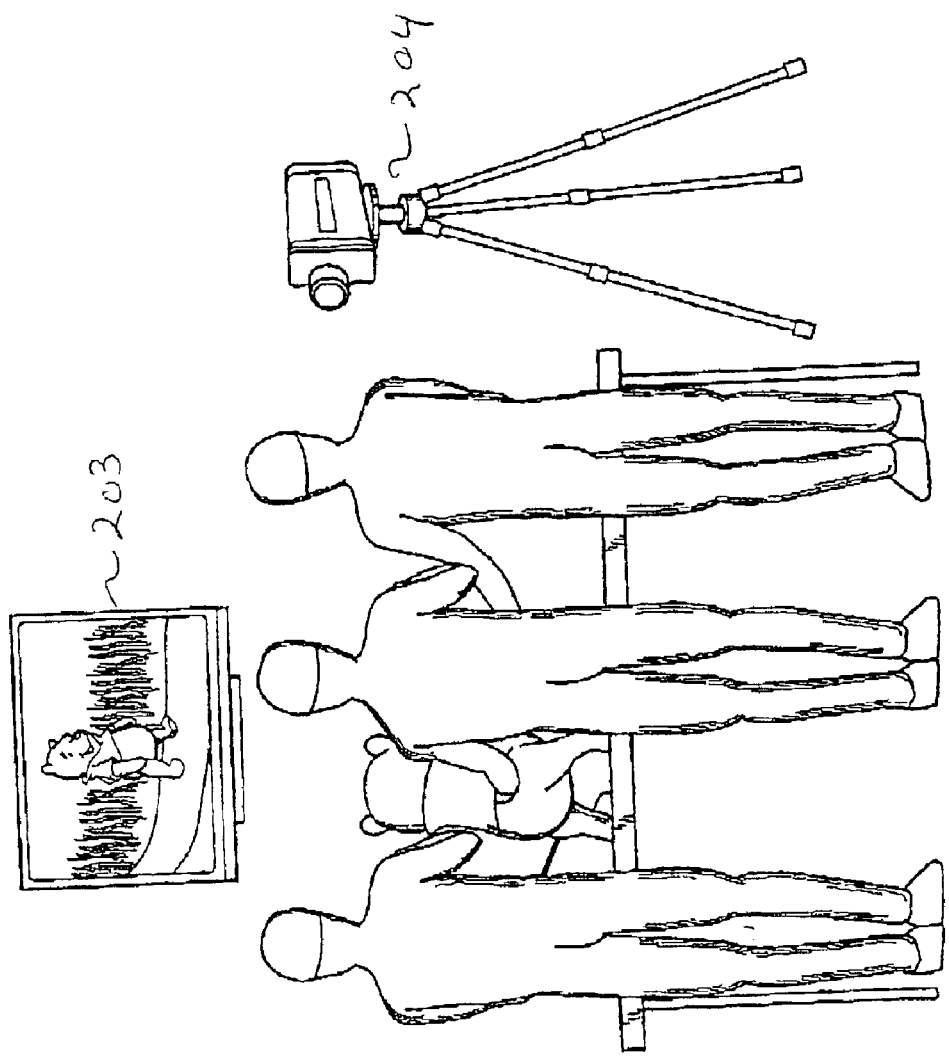
FIG. 3 illustrates a rear view of the virtual set of the instant invention.

FIG. 3 illustrates a rear view of the set in FIG. 1 showing what the puppeteers see while manipulating puppet 103. As indicated, the puppeteers can readily watch the finished product on monitor 203, while the action is taking place. Most importantly, since the final image is generated and composited in real time as the actual performance is shot by digital camera 204, the puppeteers can see the composited final image on the monitor in real time. Therefore, the puppeteers have the complete ability to interact with their environment, any virtual and real objects in that environment and each other.

Although one specific embodiment of the invention has been shown and described, it will be understood that various modifications can be made to both the apparatus and method of the present invention without departing from the spirit and scope of the invention.

What is claimed is:

1. A method for creating a virtual film or video production utilizing an advanced form of puppetry such as Bunraku Puppetry comprising the steps of:

positioning an articulated puppet on a support structure to be filmed in front of a key-color background screen, said support structure being arranged to provide a desired vertical location on said key-color background screen, said puppet including an articulating mechanism having a color that matches that of said key-color background screen and being connected to said puppet at a plurality of separated locations, said articulated puppet being capable of movement in a plurality of directions in response to corresponding movements of said articulating mechanism, a first subset of said plurality of directions forming a plane and a second subset of said plurality of directions forming an angle with respect to said plane, such articulating mechanism being controlled by a plurality of puppeteers for each puppet;

providing lighting effects in order to eliminate shadows created by said puppeteers, said lighting effects comprising a plurality of diffused lighting sources built into said support structure, filming movements of said articulated puppet and said articulating mechanism;

creating a virtual background to appear in said film; and combining said film and said virtual background whereby said articulated puppet appears in said virtual background minus any appearance of said articulating mechanism.

2. Apparatus for utilizing an advanced form of puppetry such as Bunraku Puppetry for film and/or video productions, said apparatus comprising:

a key color background screen;

a source for creating a virtual background;

a puppet having an articulated mechanism, said mechanism being the same color as said key color background screen and being connected to said puppet at a plurality of separated locations, said articulated puppet being capable of movement in a plurality of directions in response to corresponding movements of said articulated mechanism, said articulating mechanism being controlled by a plurality of puppeteers, a first subset of said plurality of directions forming a plane and a second subset of said plurality of directions forming an angle with respect to said plane;

a support structure for supporting said puppet in front of said key-color background screen;

a lighting system for said film and/or video production, said lighting system utilized for eliminating shadows created by said puppeteers; said lighting system comprising a plurality of diffused lighting sources built into said support structure;

a camera for recording images of said puppet against the background of the key-color screen; and apparatus for combining said image and said virtual background and removing from said combined image the appearance of said articulating mechanism.

* * * * *